July 25, 1961  H. S. LENHART  2,993,598
HARVESTING METHOD AND APPARATUS
Filed Aug. 13, 1957  5 Sheets-Sheet 1

FIG. 1

INVENTOR.
HERBERT S. LENHART
BY
Barrows & Taylor
attys

July 25, 1961

H. S. LENHART 2,993,598

HARVESTING METHOD AND APPARATUS

Filed Aug. 13, 1957

INVENTOR.
HERBERT S. LENHART

July 25, 1961  H. S. LENHART  2,993,598
HARVESTING METHOD AND APPARATUS
Filed Aug. 13, 1957  5 Sheets-Sheet 3

INVENTOR.
HERBERT S. LENHART

July 25, 1961  H. S. LENHART  2,993,598
HARVESTING METHOD AND APPARATUS
Filed Aug. 13, 1957  5 Sheets-Sheet 4

*INVENTOR.*
HERBERT S. LENHART
BY

July 25, 1961  H. S. LENHART  2,993,598
HARVESTING METHOD AND APPARATUS
Filed Aug. 13, 1957  5 Sheets-Sheet 5

INVENTOR.
HERBERT S. LENHART

United States Patent Office 2,993,598
Patented July 25, 1961

2,993,598
HARVESTING METHOD AND APPARATUS
Herbert S. Lenhart, Allentown, Pa., assignor to Fuller Company, a corporation of Delaware
Filed Aug. 13, 1957, Ser. No. 677,905
29 Claims. (Cl. 209—135)

The present invention relates to the pneumatic handling of materials, and is more specifically concerned with the pneumatic picking or harvesting of crops, particularly cotton.

The harvesting of crops, particularly when accomplished by pneumatic means, frequently involves the problems of reducing the amount of trash such as plant leaves picked up with the crop, prevention of damage or degradation of the crop during harvesting, and the removal of interspersed trash from the collected crop prior to transference to general storage or market. The prior attempts to solve these problems, as well as other problems more specific to individual crops or circumstances, have not been completely satisfactory.

The present invention, hereinafter conveniently disclosed and described as embodied in a cotton picker, may be applied to various crops and harvesting applications when adapted to the specific characteristics and conditions thereof.

In general, the preferred form of the present invention comprises a closed vessel adapted to be evacuated by a blower through a screened outlet, to receive cotton in a stream of air through one or more nozzles, inlet hoses and inlets, to separate trash from the cotton, and to unload itself by introducing conditioned cotton into a stream of air discharged from the blower.

The inlet, or inlets, to the vessel are each provided with an interior conduit extension of a cotton pickup conduit. The vessel is provided with an apertured baffle or other surface dividing the vessel into a first, or trash-receiving chamber, and a second, or cotton-receiving chamber. The interior conduit extension is directed across the trash-receiving chamber and terminates opposite an aperture in the baffle to permit the passage of cotton therefrom through the aperture and into the cotton-receiving chamber. The baffle surface surrounding the aperture deflects trash, which explodes from the air stream with a portion of the air thereof, away from the trajectory of the cotton and into the trash-receiving chamber for collection separate from the cotton.

The vessel is provided with a pervious or perforate belt conveyor, in the lower region of its cotton-receiving chamber, which extends from adjacent the baffle to adjacent the cotton discharge, and an ejector or other means for introducing the cotton into the blower discharge stream. The perforate belt conveyor is adapted to deliver loosened cotton toward the ejector on its upper surface or course, to permit the passage of trash and air in opposite directions therethrough, and to drag such trash along its lower surface or course to a trash outlet.

A better understanding of the invention may be derived from the following drawings and description in which.

As shown in FIGS. 1 through 6, a vehicle frame 1 comprising a pair of hoops 2 and 2' and three longitudinal beams 3 carries a vessel or tank 4 comprising a cylindrical wall 5 and a pair of rear and front end walls 6 and 7, respectively.

Rear end wall 6 carries a platform 8 thereon, on which are mounted a blower 9 and its driving motor 11. The intake of blower 9 is connected by a pipe 12, having a pressure control valve 13 therein, to a gas outlet aperture 14 in the upper region of cylindrical wall 5. Adjacent the gas outlet aperture 14 and within the tank 4, an arcuate screen 15 is arranged between rear end wall 6 and a spacer 16 in spaced relation from the upper region of cylindrical wall 5. The edges of the screen 15 are welded or otherwise secured in closing relationship with the rear end wall 6, spacer 16 and lateral sections of wall 5 which are arcuately spaced from the aperture 14 so that the air evacuated from the tank 4 necessarily traverses the screen prior to entering the gas outlet aperture 14.

Front end wall 7 has a port 17 in its upper region which is closed by a cover 18 having a plurality of gas and material conduits 19 extending therethrough and protruding through port 17 into the tank 4. Within the tank, conduits 19 are connected by individual hoses 21 and clamps 22 to a corresponding plurality of interior delivery pipes 23 and communicate with exterior conduits or hoses 24 having individual pick-up nozzles 25 at their remote ends. The inner ends of the delivery pipes 23 are shrouded by a plurality of individual, coaxial, pervious conduits 26, supported by a partial baffle 27 and carrying a pair of transverse partial baffles 27a. The delivery pipes 23 terminate a short distance from a corresponding plurality of individual apertures 28 in an interior baffle 29, and may be adjusted in position with respect to the baffle and the spacing therebetween by means of the hoses 21 and clamps 22. The baffle extends across the greater part of the tank 4, dividing the tank into a first, or trash-receiving chamber 31 and a second, or cotton-receiving chamber 32. The baffle 29 forms a gap 33 with and adjacent the lower region of cylindrical wall 5.

Figure 6:
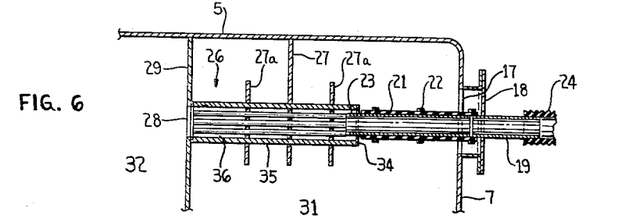
FIG. 6 is an enlarged sectional view showing the material inlet and pervious conduit of FIG. 1.

The pervious conduits 26 each comprise a frame 34 supporting a plurality of spaced rods 35 which are arranged concentrically about an axis parallel to the axis of the delivery pipe 23. A plurality of openings 36 are formed between each adjacent pair of rods. The openings 36 are correspondingly elongate and, being parallel to the delivery pipe and the path of cotton travel, offer no transverse edges upon which the passing cotton may catch and block the conduit. The openings 36 are of a size which is less than the average size of the bolls of cotton, but sufficiently large to permit passage of trash therethrough.

The degree of trash separation, the air flow through the apertures 28 and the deceleration of the cotton boll may be varied by adjusting the position of the delivery pipe 23 closer or farther from the baffle 29. A greater distance therebetween will allow more time and present more area of the pervious conduit for the separation of trash, and will release the boll from the direct action of the air stream more quickly.

Figure 1:
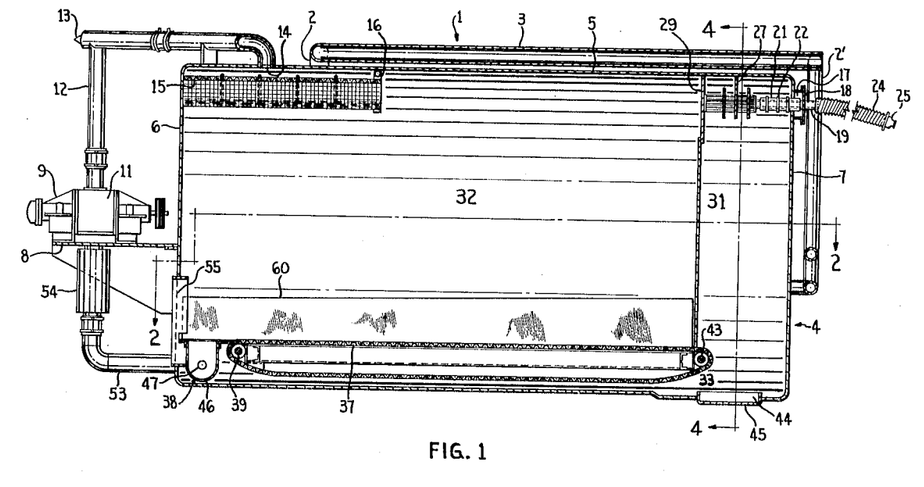
FIG. 1 is a sectional elevation of a cotton picker embodying the invention.

The pressure control valve 13 is preset to maintain a predetermined maximum of negative pressure, or minimum of absolute pressure, within the tank and thereby provides a maximum limit and means for adjusting the velocity at which air and cotton enter the tank, so that the cotton seeds are not fractured by impingement on the end wall 6 or other members of the picker. The pressure control valve 13 may be set at various pressures to adjust the maximum air/material-velocity and the rate of air flow through the apertures 28 to accommodate individual installations or conditions.

Adjacent the lower edge of baffle 29, a flexible, woven-wire belt conveyor 37, trained about pulleys 39 and 43, extends from the baffle 29 toward the rear end wall 6, rearwardly terminating its upper course adjacent a transverse ejector 38 at end wall 6, and forms a pervious floor for the cotton-receiving chamber 32. The lower or return course of the belt conveyor 37 extends along the bottom region of the cylindrical wall 5 forwardly to the rear of the trash-receiving chamber. The woven-wire belt conveyor is formed with a mesh opening sufficiently large as to permit the passage of trash therethrough while retaining the cotton and may be, for instance, ¼ inch or greater in at least one dimension.

Conveyor pulley 39 carries a ratchet drive 41 and an upwardly-extending operating handle 42, which is actuated manually when it is desired to move the belt conveyor during unloading of cotton from the chamber 32. The cylindrical wall 5, at the bottom of the trash-receiving chamber 31, is provided with a trash clean-out port 44 having a removable cover 45.

Residual trash which may be carried through the apertures 28 in the baffle 29 and into the cotton-receiving chamber 32 will generally possess substantially less momentum than the cotton and will fall short of the cotton onto and through the woven-wire belt conveyor, and onto the bottom region of the cylindrical wall 5, until the cotton has covered the full area of the belt conveyor. After the belt conveyor has been covered with cotton, a lesser amount of trash may fall with the cotton into the second chamber 32, as will be later described. Upon unloading, however, such trapped trash works down to the surface of the conveyor belt with the loosened cotton and then falls through the woven belt while the cotton is carried along to the ejector.

When the tank is filled with cotton to a point at which the distances through the cotton from the closest area of the belt conveyor 37 and from the forward or loading face of the cotton to the gas outlet 14 are substantially equal, so that the resistance to flow of air through the two courses is thus substantially equalized, subsequent filling produces an increasing resistance to the direct flow of air from the delivery pipes 23 through the apertures 28 to the screen 15, and an increasing proportion of the air is drawn radially from the ends of the delivery pipes 23 through the openings 36, trash chamber 31, under the baffle 29, through the gap 33, up through the belt conveyor 37, and through the loaded cotton to the screen 15. This gradually increases the separation of the trash from the cotton at the delivery pipe 23 and pervious conduit 26, as the chance for inertial separation of trash from the cotton in the cotton-receiving chamber 32 and for downward passage through the open belt conveyor area is gradually decreased by covering of the belt conveyor area and the filling of the tank volume with cotton.

Odd strands of lint, or other solid matter which might remain entrained in the air within the tank, are prevented from entering the blower by retention on the screen 15, and are eventually removed therefrom in matted pieces by incidental vibrations or jarring of the picker as it moves along the rows of cotton.

Figure 2:
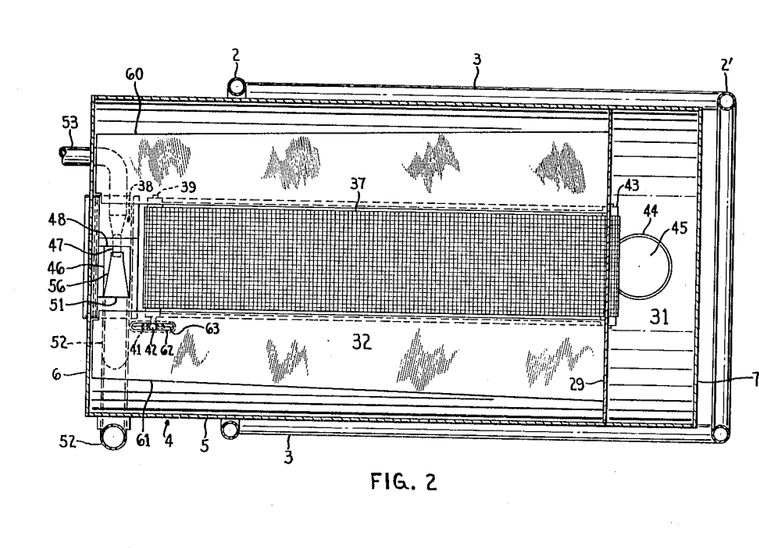
FIG. 2 is a sectional plan taken along lines 2—2 of FIG. 1.
Figure 3:
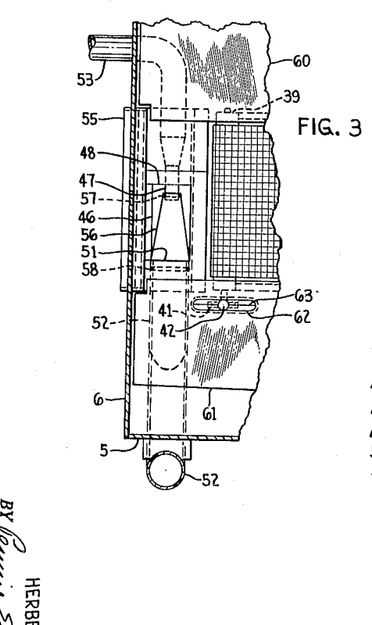
FIG. 3 is an enlarged fragmentary view of FIG. 2 showing the ejector.

The ejector 38 comprises a hopper 46 extending transversely of the end of the belt conveyor 37, and receiving a jet pipe 47 through an end wall 48 opposite an outlet 49 in an end wall 51. The outlet 49 communicates with a discharge pipe 52 which extends through the cylindrical wall 5. The jet pipe 47 communicates with the discharge of the blower 9 through a pipe 53 and a muffler 54. A tapered, hollow cone 56 has its smaller end connected by a terminal resilient sealing ring 57 to the open end of the jet pipe 47, while its larger end is directly connected by a sealing ring 58 with the discharge pipe 52. During the loading operation, the cone 56 prevents recirculation of the blower discharge air from the jet pipe 47 up through the tank to the gas outlet 14, which would short-circuit the loading system. An access door 55 is provided in rear end wall 6 adjacent the ejector 38 to permit removal of the cone 56 and operation of the handle 42 and drive 41.

Figure 4:
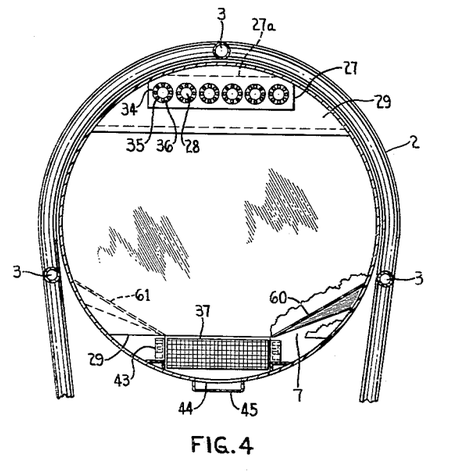
FIG. 4 is a sectional elevation taken along the lines 4—4 of FIG. 1.
Figure 5:
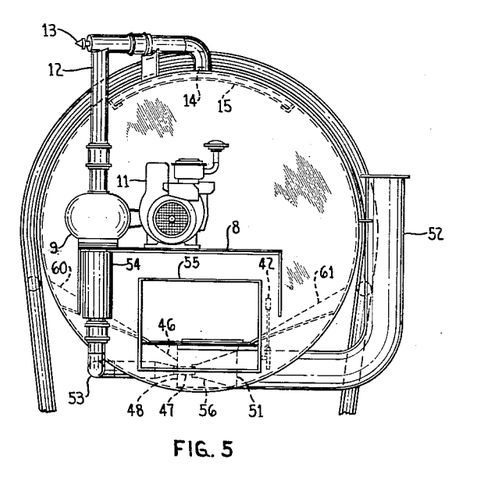
FIG. 5 is an end view of the apparatus of FIG. 1.

A pair of lateral walls or slope sheets 60 and 61 extend upwardly and outwardly from the lateral edges of conveyor 37 and join with the inner surface of cylindrical wall 5. The slope sheets 60 and 61 are inclined at an angle to the horizontal at least equal to the angle of repose of cotton. Slope sheets 60 and 61 also twist outwardly and downwardly from a point adjacent baffle 29 toward the rear end wall 6 so that the angle of inclination from the horizontal gradually decreases from near the baffle 29 toward the rear end wall 6, providing a gradually increasing cross-sectional area in the cotton-receiving chamber 32 from the baffle toward the rear end wall 6. The slope sheet 61 is provided with a slot 62 through which the handle 42 projects and is provided with a suitable seal such as a slotted rubber seal 63 to permit operation of the handle and drive 41 above the slope sheet and from the access door 55 without loss of cotton through the slot 62.

Figure 10:
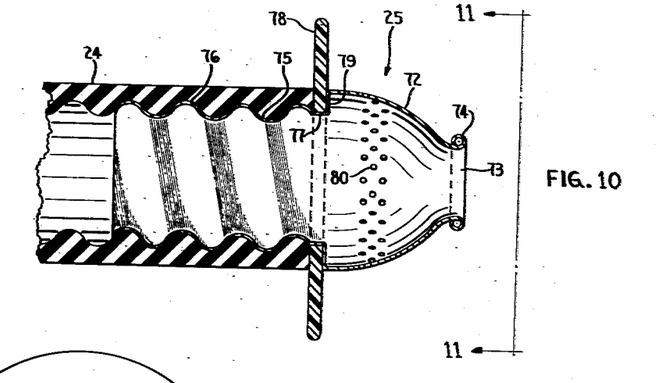
FIG. 10 is a sectional view of a nozzle for picking cotton.
Figures 11, 12:
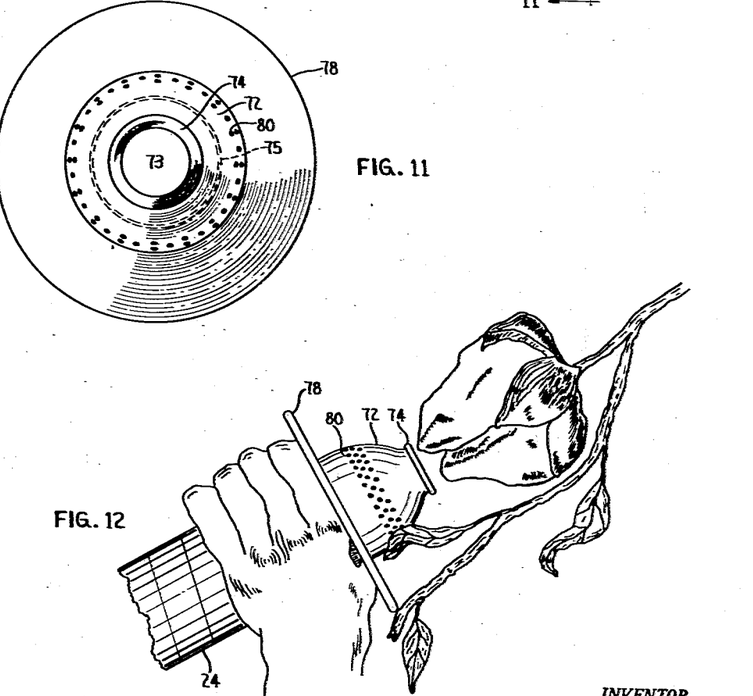
FIG. 11 is an end view of the nozzle of FIG. 9.
FIG. 12 is a view showing application of the nozzle to a cotton boll.

As shown in FIGS. 10, 11 and 12, the cotton-picking form of the nozzle 25 comprises a hollow bell 72 having an intake opening 73 with a smooth, rounded edge 74 and is provided with a hollow shaft portion 75, coaxial with the intake opening 73 and having a raised spiral thread 76 which corresponds to the inner spiral of the hose 24. An intermediate section 77 of the shaft portion 75 carries a removable, annular disc or hand guard 78 which is held in position against a shoulder 79 of the bell by pressure of the hose end when the shaft portion is threaded thereinto. A plurality of suction ports 80 are arranged about the bell 72 behind the rounded edge 75.

In the operation of the apparatus of FIGS. 1 through 6, the motor 11 is started and drives the blower 9 to evacuate air from the tank 4 successively through the screen 15, gas outlet aperture 14 and piping 12, thereby inducing a flow of air into the tank 4 through the nozzles 25, hoses 24, conduits 19, hoses 21, delivery pipes 23, and the trash-receiving and cotton-receiving chambers 31 and 32, respectively. Air exhausted by the blower is discharged through the muffler 54, piping 53, jet pipe 47, cone 56 and discharge pipe 52 to atmosphere.

The nozzles individually are applied to the cotton bolls, as illustrated in FIG. 12, whereupon the sweep of atmospheric air toward the intake opening 73 elongates the mass of lint, straining the attachment of the cotton to the stem, and ultimately entraining the cotton into the nozzle for conveying to the tank. At the same time, leaves and other types of trash which are in close proximity to the cotton boll are also affected by the air motion, and tend to be swept around toward the intake opening 73. However, the simultaneous motion of air toward and into the suction ports 80 traps the trash on the outer surface of the bell, and holds it against the bell surface over the suction ports, preventing its continuation toward the intake opening. Since the ports 80 are very small, in relation to the size of the cotton and associated trash, the suction ports 80 do not permit the entry of trash therethrough to the interior. Upon removal of the cotton from the plant, and motion of the nozzle to an adjacent boll, trash held against the suction ports is pulled off, in the case of a leaf still attached to the plant, or may be subsequently brushed off, in the case of fragmentary trash.

As the nozzle is applied to the boll, the disc shields the hand of the operator and, particularly when a boll is to be picked from a position relatively deep within the plant, is operable to deflect stems and branches away from the intake opening to reduce the likelihood of trash pick-up.

The protruding and smooth arrangement of the rounded edge 74 facilitates the removal of tightly secured portions of the cotton bolls, in that the intake may be extended into the bottom of the pod with a minimum of breakage of the dry and brittle hulls surrounding the lint.

For cotton picking purposes, the intake opening and suction ports may be, for instance, in the order of one inch and one-eighth inch in diameter, respectively, while for other crops, the dimensions may be chosen to suit the size of the material to be harvested.

Cotton bolls introduced into the air stream in the nozzles 25 are conveyed into the tank 4 through the delivery pipe 23 and apertures 28. However, as a boll clears the end of a delivery pipe 23, the relatively compressed air in the pipe behind the boll is suddenly released into the trash-receiving chamber 31, exploding radially from behind the boll and through the pervious conduit openings 36, thereby facilitating deceleration of the boll, and carrying bits of leaves and other trash of low mass laterally through the openings 36 and into the trash chamber 31. Trash thus separated from the cotton falls between the baffle 29 and the end wall 7 to collect on and adjacent the clean-out port 44.

The cotton bolls leaving delivery pipes 23 retain sufficient momentum to follow a trajectory through the apertures 28 into the cotton-receiving chamber 32, and closely approach or strike the far rear end wall 6, thereby delivering the initially loaded cotton to the far end of the tank, preferably at velocities sufficiently low to prevent fracture of the oily cotton seeds against rigid objects, and consequent degradation of the cotton.

After the cotton chamber has been filled, the access door 55 is opened and the cone 56 is removed from the ejector 38. The blower 9 then discharges compressed air through the muffler 54, piping 53 and jet pipe 47, to entrain and discharge cotton through pipe 52, which may deliver it to a receiving truck, or other container.

As the cotton above the ejector is removed, the ratchet drive 41 is operated by handle 42 to actuate the belt conveyor 37 to deliver the adjacent and remaining cotton to the ejector. As the load of cotton is drawn rearward by the belt conveyor, the horizontal decrease, in a rearward direction, of the angle of slope of the slope sheets 60 and 61 decreases the bridging effect of those sheets on the cotton, so that the belt assumes the greater part of the load for more effective transfer of the cotton to the ejector. Also, the packed cotton is loosened by progressing to the greater cross-sectional area, preparatory to entrainment in the ejector, and affords further opportunity for trash present therein to fall through the woven belt conveyor.

As the cotton is carried rearward on the upper course of the belt conveyor 37, the slack lower, or return, course drags the bottom area of the cylindrical wall 5, thereby brushing the trash thereon toward the clean-out port 44 for discharge with the trash collected in the trash chamber 31.

Figure 7:
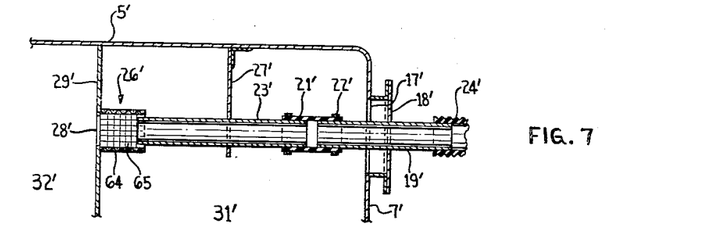
FIG. 7 is an enlarged sectional view showing a modified form of pervious conduit.
Figure 8:
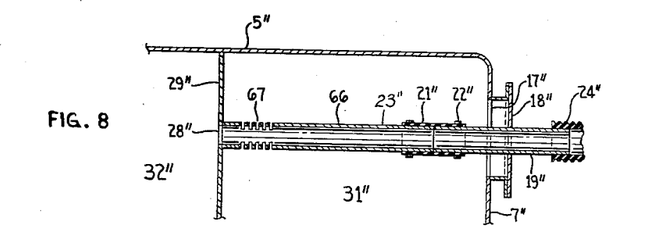
FIG. 8 is an enlarged sectional view showing a further modified form of pervious conduit.
Figure 9:
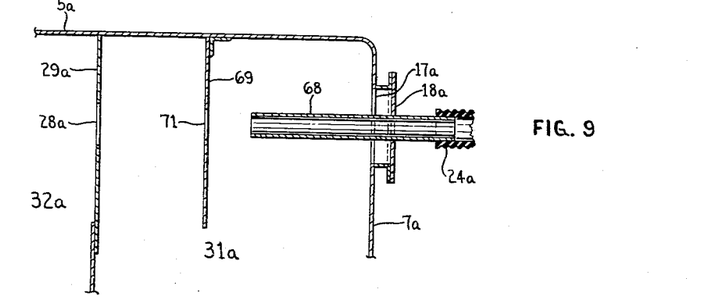
FIG. 9 is an enlarged sectional view showing still another form of inlet and trash separator.

In FIGS. 7, 8 and 9, there are shown modified forms of the means for separating trash from the cotton as it emerges from the delivery pipes 23. In FIG. 7, the same numerals, primed, are used to identify elements similar to those of FIG. 6. As shown in this figure, the pervious conduit 26' comprises a tubular screen 64 formed of round strands of wire and is secured on the baffle 29' generally coaxially with the aperture 28' therein. The screen 64, into which the end of the conduit extension 23' extends, has a plurality of openings 65 which provide for relatively free communication of the interior of the pervious conduit 26' with the trash-receiving chamber 31'.

In operation of this embodiment, cotton entrained in the air stream delivered through the delivery pipe 23' is conducted to the aperture 28' and into the cotton-receiving chamber 32', and a portion of the air stream explodes and carries trash through the openings 65 into the trash chamber 31'.

In FIG. 8, elements similar to those shown in FIG. 6 are designated by the same reference characters double-primed. In this figure, the pervious conduit comprises a delivery pipe extension 66 which is contiguous with the delivery pipe 23" and is secured to the baffle 29" in alignment with the aperture 28" therein. A plurality of circumferentially directed openings or slots 67 are provided in the delivery pipe extension 66 adjacent the baffle 29", and communicate with the trash-receiving chamber 31".

In the operation of the embodiment shown in FIG. 8, the entrained cotton is conducted through the delivery pipe extension 66 and the aperture 28" into the cotton-receiving chamber 32", while a portion of the air stream explodes and carries trash through the slots 67 and into the trash chamber 31". This arrangement is particularly advantageous in cases in which the cotton, or other material to be conveyed, is present in sufficiently small units, in terms of the unit's mass, as to tend to be entrained radially by the exploding air. The circumferentially-directed slots force the exploding air to turn from its original direction at a sharp angle, or on a very short radius of curvature, in order to escape into the trash chamber. However, the sharp turn, although it may be desirable since it acts as a deterrent to entrainment of the desired material through the slots, also may be less effective for trash separation, under heavy trash conditions, than the other embodiments disclosed herein.

The several openings of the pervious conduits shown in FIGS. 6, 7 and 8 have a dimension which is smaller than the average size of the cotton bolls, and larger than the average size of the trash picked up and conveyed therewith and may be, as an example, in the order of ⅜ of an inch. In each case, the cotton is conducted directly to the cotton-receiving chamber, while the trash passes through the openings with a portion of the air stream into the trash chamber. The screen 64 of FIG. 7 provides the greatest free area per unit length for explosion of air into the trash chamber, and the rounded strands thereof provide little opportunity for cotton to catch or lodge thereon. However, the parallel rods 35 of FIG. 6 provide a particularly advantageous pervious conduit in that it requires a less acute angle or longer radius of directional change for the trash, since the trash is allowed a greater longitudinal travel during which it can diverge and pass between the rod into the trash chamber, and offers no transverse edges on which the lint can become caught or entangled.

In the modification shown in FIG. 9, the same reference characters with the exponent $a$ are used to designate parts similar to those shown in FIG. 6. In this figure, an extension of the delivery pipe 68 is supported by the cover 18a and terminates within the trash chamber 31a. Spaced from the end of the delivery pipe 68 and from the baffle 29a, an intermediate baffle 69 is arranged across the upper portion of the trash chamber 31a and is provided with an aperture 71 opposite the end of the delivery pipe 68. The aperture 71 is in alignment with the delivery pipe 68 and the aperture 28a of baffle 29a to permit the passage of cotton serially through the apertures 71 and 28a to the cotton chamber 32a.

In operation of the embodiment shown in FIG. 9, cotton entrained in an air stream discharged from the delivery pipe 68 is projected through the aperture 71, across the space between the intermediate baffle 69 and baffle 29a, and through the aperture 28a into the cotton-receiving chamber 32a. A portion of the air stream explodes from behind the cotton emerging from the delivery pipe 68, and sweeps trash radially away from the cotton path. Trash which may carry through the aperture 71 is subjected to eddy currents adjacent the downstream side of aperture 71 and in the remainder of the space between the baffles, and also may be caused to drop from the trajectory of the cotton because of its lesser mass and, consequently, lesser momentum. The trash separated at the end of the delivery pipe extension 68 and between the baffles is collected in the lower region of the trash chamber.

The embodiment shown in FIG. 9 is particularly advantageous in cases in which there is, in normal operation, a substantially distinct difference between the average masses of the cotton, or other desired product, and the trash associated therewith.

The apertures shown opposite the ends of the several disclosed forms of delivery pipes are preferably coaxial therewith, and advantageously may be made larger in size than the interior of the delivery pipe to allow for expansion of the cotton boll after it leaves the pipe. In the embodiment shown in FIG. 9, it is preferable that both apertures 71 and 28a be larger in diameter than the diameter of the delivery pipe, and further that the downstream aperture 28a be larger than the aperture 71 to allow for continued expansion of the bolls, and to allow for the vertical drop of the trajectory of the cotton over the horizontal distance between the intermediate baffle 69 and the baffle 29. The degree of enlargement of the several apertures is dependent upon the characteristics of the material harvested and its velocity and trajectory, and is to be determined accordingly.

As the cotton boll leaves the end of the disclosed delivery pipes, the explosion of the air from behind the boll into the evacuated tank entrains trash and extraneous matter and carries it radially away from the original direction of the air stream. The sudden release of the air from behind the cotton boll reduces the conveying effect exerted on the boll, and allows the boll to approach a free-falling path or trajectory. However, as the boll enters, and therefore obstructs the aperture, its horizontal velocity is momentarily boosted. Since the exhausting of the vessel is accomplished on the downstream side of the baffle, and the influx of air is located on the upstream side of the baffle, with respect to the direction of cotton movement, a pressure drop will normally be encountered across the baffle. As the boll obstructs the aperture, the pressure differential will tend to be momentarily increased, and the greater pressure on the upstream side will force the boll through the aperture toward the low pressure side, thereby imparting a slight boost in velocity to the boll.

The air exploding laterally behind the cotton as it proceeds toward the aperture entrains trash from the air stream and carries it into the trash-receiving chamber between the baffle and the end wall. Although the cotton and any trash present in the air stream through the conduit and the delivery pipe will both have substantially the same velocity, they possess relatively different orders of mass, with the cotton boll exhibiting a substantially greater mass, and therefore possessing a correspondingly greater order of momentum. The greater momentum of the cotton makes it less subject to the lateral explosion of the air stream, and tends to direct the cotton along its original path, so that there is little tendency for the cotton to enter and plug the openings in the pervious conduit section or the apertures in the baffles. However, the extraneous matter present in the air stream, being of lower mass and possessing correspondingly less momentum, will be prone to entrainment in the air diverging radially from behind the cotton, and will be carried therewith abruptly into the trash chamber or, if relatively large in mass, and therefore less readily entrained, may barely escape from the path of the cotton, subsequently ricocheting off the surface of the baffle immediately about the aperture and into the trash chamber.

The flow of a portion of the air stream radially from the end of the delivery pipes and downwardly through the trash chamber carries trash separated therewith to the bottom thereof, and the air, upon turning to enter the space beneath the belt conveyor, throws any entrained trash out of suspension onto the area adjacent the trash clean-out port. The area of the pervious belt conveyor is sufficiently large to produce a low velocity in the portion of the air stream which is drawn upwardly therethrough, thereby allowing trash to fall through the belt without entrainment or substantial hindrance by the rising air.

The air flow under the baffle and upwardly through the belt conveyor 37 and the overlying cotton prevents the condensation of moisture in the first loaded cotton, which otherwise may be caused by the cooling effect of the air expansion in the tank, and thereby prevents the degradation of the cotton by chlorophyll and other water-soluble or water-miscible matter entangled in the lint.

The provision of the cone 56 permits the inclusion of the ejector within the vessel and its use, during loading of the picker, as a discharge for the blower. The cone prevents the collection and compaction of cotton into the entire space of the ejector hopper during loading. A compacted mass of cotton jamming the hopper would choke the discharge pipe. When the cone is removed for unloading, it permits cotton to fall loosely into the space it occupied, thereby facilitating the initial entrainment and unloading of the cotton.

The conical form of the cone is advantageous for structural resistance to deformation by the unbalance of pressures, and permits the use of peripheral resilient sealing members, such as the O rings shown. The use of O rings and a non-deforming cone precludes the need for clamps, gaskets and tools which would normally be required for other forms of inserts.

During unloading, the gradual rearward decrease of the slope of the slope sheets loosens the mass of compacted cotton. This gradual loosening of the load of cotton facilitates the separation of residual trash from the cotton mass by permitting such trash eventually to fall onto and through the pervious belt conveyor, and prepares the cotton for consistent and efficient entrainment in the air stream from the blower discharge. If the cotton were fed into the ejector in relatively compact masses or bunches, a portion of the energy available in the air stream would be consumed in dispersing the bunches into individual bolls, or small groups thereof. With the cotton in a relatively loose condition, the individual bolls or small groups can be entrained almost immediately upon entry into the ejector, without consuming excessive energy and time for loosening and dispersing prior to entrainment.

As the belt conveyor is operated to carry cotton to the ejector area, it has an undercutting effect on the body of cotton, and tends to deliver the lowermost cotton first, with the cotton last introduced into the cotton chamber 32 and which is in the upper forward end of the chamber 32 rolling down the receding face of the pile of cotton to fall upon the clean surface of the belt conveyor as it emerges from beneath the baffle 29, so that trash contained therein may fall through the belt conveyor to be dragged to the forward end of the tank 4 for discharge through the trash clean-out port 44.

Various changes may be made in the details of construction without departing from the spirit of the invention or sacrificing any of the advantages thereof.

I claim:

1. Material-receiving apparatus for the separation of harvested crops from non-crop material comprising a vessel having a gas-material inlet through which material entrained in gas under pressure is adapted to be supplied to said vessel and a gas outlet, partitioning means within said vessel dividing it into a first chamber and a second chamber, the outlet from said vessel being in said second chamber, said first chamber being closer to said inlet, said partitioning means having an aperture therein in alignment with said inlet, the direct path from said inlet to said aperture passing through said first chamber, at least a portion of the passage directly between said gas-material inlet and the aperture in the partitioning means being laterally unconfined, whereby a stream of gas carrying entrained material passing under pressure from said inlet on reaching said laterally unconfined space will expand laterally and carry particles of the entrained material of lesser mass out of the direct path between said gas-material inlet and the aperture in the partitioning means to settle into said first chamber while the material of greater mass will continue along said path and through said aperture to fall into said second chamber.

2. Material receiving apparatus for the separating of harvested crops from non-crop material comprising a vessel having a gas-material inlet through which material entrained in a gas under pressure is adapted to be supplied to said vessel and a gas outlet, partitioning means within said vessel dividing it into a first chamber and a second chamber, said first chamber being closer to said inlet, said partitioning means having an aperture therein in alignment with said inlet, a conduit extending from said gas-material inlet to the aperture in the partitioning means, said conduit having openings in the sides thereof, whereby a stream of gas varrying entrained material passing under pressure from said inlet to the opening in the partition will expand laterally through said openings and carry particles of the entrained material of lesser mass out of said conduit to settle into said first chamber while the material of greater mass will continue along said conduit and through the aperture in the partition to fall into said second chamber.

3. A material-receiving apparatus as set forth in claim 2 in which a baffle extends around the portion of said conduit having the openings therein.

4. A material-receiving apparatus as set forth in claim 2 in which the openings in the conduit are elongated in the direction of the conduit.

5. A material-receiving apparatus as set forth in claim 4 in which a portion of the conduit is formed of longitudinally-extending peripherally-spaced rods.

6. A material-receiving apparatus as set forth in claim 2 in which a portion of the conduit is a screen.

7. Material-receiving apparatus as set forth in claim 6 in which the screened portion of the conduit is located adjacent the partitioning means.

8. Material-receiving apparatus as set forth in claim 2 in which the conduit has a series of transverse, longitudinally-spaced slots.

9. Material-receiving apparatus as set forth in claim 1 in which at least one baffle extends across the direct path from the gas-material inlet to the aperture in the partitioning means and said baffle has an opening in alignment with said direct path.

10. Material-receiving apparatus as set forth in claim 9 in which said conduit is in alignment with the aperture in the partitioning means and terminates short of said baffle.

11. Material-receiving apparatus as set forth in claim 2 in which a conduit extends from said gas-material inlet to the aperture in the partitioning means, said conduit is formed into two telescoping sections, a perforate section adjacent the opening in the baffle and an imperforate section adjacent said gas-material inlet, and means are provided for relatively adjusting said telescoping sections to cause the end of the imperforate section to terminate at different distances lengthwise of the perforate section, whereby the portion of the air stream expanded into said first chamber may be varied in magnitude.

12. Harvesting apparatus comprising a vessel having a gas-material inlet and a gas outlet, partitioning means within said vessel dividing it into a trash-receiving chamber adjacent said gas-material inlet and a chamber for harvested material positioned at the side of the trash-receiving chamber remote from said gas-material inlet, the outlet from said vessel being in said chamber for harvested material, said partitioning means having an aperture therein, a collecting conduit for harvested material connected to said inlet, said collecting conduit terminating at its outer end in a harvesting nozzle, the inner end of said collecting conduit being in alignment with the aperture in said partitioning means, means for causing a flow of gas under pressure through said collecting conduit into said vessel, at least a portion of the passage directly between the inner end of the collecting conduit and the aperture in the partitioning means being laterally unconfined, whereby a stream of gas under pressure carrying entrained harvested material passing from the inner end of said collecting conduit towards the aperture in the partitioning means, on reaching said laterally-unconfined space will expand laterally and carry particles of entrained material of lesser mass out of the direct path between the inner end of said harvesting conduit and the aperture in the partitioning means to settle into said trash-receiving chamber, while material of greater mass will continue towards and pass through said aperture to fall into the chamber for harvested material.

13. Harvesting apparatus comprising a vessel having a gas-material inlet and a gas outlet, partitioning means within said vessel dividing it into a trash-receiving chamber adjacent said gas-material inlet and a chamber for harvested material positioned at the side of the trash-receiving chamber remote from said gas-material inlet, said partitioning means having an aperture therein, a collecting conduit for harvested material connected to said inlet, said collecting conduit terminating at its outer end in a harvesting nozzle, the inner end of said collecting conduit being in alignment with the aperture in said partitioning means, means for causing a flow of gas under pressure through said collecting conduit into said vessel, at least a portion of the passage directly between the inner end of the collecting conduit and the aperture in the partitioning means being laterally unconfined, whereby a stream of gas under pressure carrying entrained harvested material passing from the inner end of said collecting conduit towards the aperture in the partitioning means, on reaching said laterally-unconfined space will expand laterally and carry particles of entrained material of lesser mass out of the direct path between the inner end of said harvesting conduit and the aperture in the partitioning means to settle into said trash-receiving chamber, while material of greater mass will continue towards and pass through said aperture to fall into the chamber for harvested material, and means for adjusting the gas-material velocity and the rate of gas flow through said collecting conduit.

14. Harvesting apparatus comprising a vessel having a gas-material inlet and a gas outlet, partitioning means within said vessel dividing it into a trash-receiving chamber adjacent to said gas-material inlet and a chamber for harvested material positioned at the side of the trash-receiving chamber remote from said gas-material inlet, said partitioning means having an aperture therein, a collecting conduit for harvested material connected to said inlet, said collecting conduit terminating at its outer end in a harvesting nozzle, the inner end of said collecting conduit being in alignment with the aperture in said partitioning means, means for causing a flow of gas under pressure through said collecting conduit into said vessel, a conduit extending from the gas-material inlet to the aperture in the partitioning means, said conduit having openings therein in that portion thereof which passes through the trash-receiving chamber, whereby a stream of gas under pressure carrying entrained harvested material passing through said conduit will expand laterally through said openings and carry particles of entrained material of lesser mass out of said conduit to settle into said trash-receiving chamber, while material of greater mass will continue towards and pass through the aperture in the partitioning means to fall into the chamber for harvested material.

15. Harvesting apparatus as set forth in claim 14 in which the trash-receiving chamber has an outlet for collected trash and the chamber for harvested material has an outlet for harvested material.

16. Harvesting apparatus as set forth in claim 14 in which the chamber for harvested material has a gas-pervious floor portion spaced from the bottom of the vessel and extending into said chamber for harvested material from said partitioning means, said gas-pervious floor portion having openings therein of a size to permit trash to pass downwardly therethrough but restraining the passage of the trash-free harvested material therethrough, and the lower end of the partitioning means terminates above said gas-pervious floor portion, whereby air expanding into said trash-receiving chamber may pass under the lower end of the partitioning means and up through said gas-pervious floor portion to aerate harvested material deposited on said floor portion.

17. Harvesting apparatus as set forth in claim 16 in which the gas-pervious floor portion is a movable belt, said movable belt being movable toward an end of the vessel, and said vessel has a material outlet for harvested material adjacent the end towards which the movable belt moves and adjacent the end of the movable belt, whereby harvested material falling on said belt may be delivered by it to said material outlet.

18. Harvesting apparatus as set forth in claim 16 in which said gas-pervious floor portion is the upper course of an endless belt conveyer, said upper course of the belt conveyer moves in a direction away from the partitioning means towards the opposite end of the vessel, and said vessel has an outlet for harvested material adjacent said opposite end of the vessel and adjacent the end of the endless belt conveyer remote from the partitioning means, whereby harvested material falling onto the upper course of said conveyer may be delivered by it to said outlet for harvested material.

19. Harvesting apparatus as set forth in claim 17 in which the lower course of the endless belt conveyer passes close to the bottom of the vessel, and said trash-receiving chamber has an outlet in the bottom of the vessel, whereby the lower course of the belt conveyer will deliver trash falling through the endless belt conveyer to a point adjacent the outlet in the trash-receiving chamber.

20. Harvesting apparatus as set forth in claim 17 in which a slope sheet extends upwardly and outwardly from at least one side edge of the endless belt conveyer to adjacent the side wall of the vessel at said side wall of the conveyer and the angle of inclination of said slope sheet is less at the end of the vessel having the outlet for harvested material than at its other end.

21. Harvesting apparatus as set forth in claim 17 in which the endless belt conveyer extends along an intermediate portion of the bottom of the vessel, slope sheets extend upwardly and outwardly from adjacent the edges of the endless belt conveyer to adjacent the side walls of the vessel, and the angle of inclination of the slope sheets decreases at the end of the vessel having the outlet for harvested material.

22. Harvesting apparatus as set forth in claim 21 in which the end portions of said slope sheets adjacent the end of the vessel having the outlet for harvested material are twisted outwardly and downwardly.

23. Harvesting apparatus as set forth in claim 21 in which said slope sheets are twisted outwardly and downwardly throughout substantially their entire length.

24. Harvesting apparatus as set forth in claim 21 including means for pneumatically entraining harvested material passing through the outlet for harvested material, whereby harvested material on said endless belt conveyer moving towards said outlet for harvested material will be loosened in its travel toward said outlet.

25. Harvesting apparatus comprising a vessel having a material inlet and a material outlet, a movable belt arranged within the vessel and movable toward said material outlet, at least one slope sheet extending upwardly and outwardly from an edge of said movable belt to a side wall, said slope sheet twisting outwardly and downwardly to a lesser angle of inclination at its end adjacent said material outlet than at its other end, and means for entraining in a stream of air the material passing through said material outlet.

26. Material-receiving and discharging apparatus comprising a vessel having a gas-material inlet, a gas outlet, and a material outlet, material-entraining means within said vessel and communicating with the material outlet, means for delivering to the material-entraining means material entered through said gas-material inlet, means for causing a flow of gas through said gas-material inlet, said vessel, said gas outlet and said material-entraining means, and means for confining the gas flow in said material-entraining means for discharge through said material outlet, whereby the gas flowing through said material-entraining means may be prevented from disturbing the air flow through said vessel.

27. Apparatus as set forth in claim 26 in which said material-entraining means comprises an ejector having a hopper, a jet pipe, and a discharge conduit communicating with said hopper and aligned with said jet pipe, said hopper having a material-receiving aperture, and including a displaceable conduit section extending between said jet pipe and said discharge conduit and in substantially sealed relationship therewith.

28. The method of separating constituent parts of material carried in a gas stream under pressure which comprises directing a blast of gas-carrying entrained materials of lesser and greater masses along a path toward an aperture in a wall, laterally expanding the gas along at least a portion of said path to carry the entrained material of lesser mass only out of said path, while the material of greater mass continues along said path and passes through said aperture.

29. The method of separating constituent parts of material as set forth in claim 28 which includes confining the blast of gas laterally along the major portion of said path.

References Cited in the file of this patent

UNITED STATES PATENTS

| | | |
|---|---|---|
| 1,660,682 | Stebbins | Feb. 28, 1928 |
| 1,684,981 | White | Sept. 18, 1928 |
| 1,959,864 | Hartley | May 22, 1934 |
| 2,087,464 | Ayers | July 20, 1937 |
| 2,255,206 | Duncan | Sept. 9, 1941 |
| 2,646,593 | Downey | July 28, 1953 |
| 2,702,471 | Vonnegut | Feb. 22, 1955 |

FOREIGN PATENTS

| | | |
|---|---|---|
| 346,481 | Great Britain | Apr. 16, 1931 |
| 1,120,819 | France | Apr. 23, 1956 |
| 1,057,451 | France | Oct. 28, 1953 |

UNITED STATES PATENT OFFICE
CERTIFICATE OF CORRECTION

Patent No. 2,993,598                                               July 25, 1961

Herbert S. Lenhart

It is hereby certified that error appears in the above numbered patent requiring correction and that the said Letters Patent should read as corrected below.

Column 9, line 25, for "varrying" read -- carrying --; column 9, line 56, after "which" insert -- a conduit for gas and entrained material extends through said gas-material inlet, and --; lines 60 and 61, delete "a conduit extends from said gas-material inlet to the aperture in the partitioning means, -

Signed and sealed this 5th day of December 1961.

(SEAL)
Attest:

ERNEST W. SWIDER
Attesting Officer

DAVID L. LADD
Commissioner of Patents

USCOMM-DC